Sept. 14, 1965 S. BAUMGART ETAL 3,206,728

IDENTIFICATION SIGNALLING SYSTEM UTILIZING A TRANSPONDER

Filed April 24, 1961 3 Sheets-Sheet 1

IDENTIFICATION SIGNALLING SYSTEM UTILIZING A TRANSPONDER

Filed April 24, 1961 3 Sheets-Sheet 2

United States Patent Office 3,206,728
Patented Sept. 14, 1965

3,206,728
IDENTIFICATION SIGNALLING SYSTEM UTILIZING A TRANSPONDER

Siegfried Baumgart, Hans Ulrich Meyer, Wilbrand Lüers, and Rolf Beyersdorff, Braunschweig, Germany, assignors to Siemens & Halske, Aktiengesellschaft, Munich, Germany, a corporation of Germany Filed Apr. 24, 1961, Ser. No. 105,169
Claims priority, application Germany, May 2, 1960, S 68,308
13 Claims. (Cl. 340—152)

This invention relates to signalling systems using automatic interrogation of coded vehicles which move on a predetermined track past stationary interrogators which are temporarily coupled to electronic transponders located in or on the coded vehicles; in particular, for interrogating vehicle codes in railroad systems and mines. Installations of this nature are necessary or useful in transport systems where coded indicia or information concerning origin, consignment and/or destination of a vehicle is to be recorded automatically at the interrogation sites and/or is to be utilized for subsequent routing procedures. For instance, in mine pits the mine cars arriving from the shaft must be tallied according to source, weight and type of contents, e.g., grade of coal or mineral, and then processed to specified bunkers. Since frequently the empty cars must be taken to other source locations, or must be loaded with a different material, provisions frequently must be made for changing the indentification as may be necessary.

The basic problem underlying this invention is to be able to establish whatever code may be required or to erase the code when the electronic transponders pass certain points along the track without requiring either a mechanical or a galvanic connection between the transponders and the priming or code-establishing devices and the code erasing devices respectively, or changes in the circuitry of the transponders by means of magnet or motor-operated contacts. According to the invention this problem can be solved by installing well known magnetic memory cores in the transponders whose magnetized states may be changed according to the code desired. This may be accomplished by means of a A.C. signals inductively transmitted at encoding or "priming" stations and at erasing stations located along the track, the A.C. signals then being received and rectified in the response unit. It is particularly effective to use so-called "transfluxors" as magnetic memories, so that the code may be interrogated a number of times, if desired, without erasing. For example, it is possible to use the windings of these transfluxors as magnetically-controlled inductances in order to change the resonance frequencies of interrogated circuits. Furthermore, the transfluxors may serve as magnetically-controlled transformers for interrogated resonance frequencies, or as storage devices in counters or in shift registers. Some examples of application for the invention are shown in the figures and explained in what follows.

Therefore, it will be seen that it is a primary object of the present invention to provide an improved inductive identification system of the character described in which various transponders may be encoded easily and reliably at predetermined priming stations without resort to mechanical or galvanic connections between the transponders and stationary trackside apparatus or resort to operated contacts in the transponders.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

In all examples shown herein it is assumed that the identification codes of mine transport vehicles are set or primed, interrogated, and erased if necessary. Also, in all forms of the invention, no separate power source is contained in the transponders, but instead the energy of received A.C. signals is used to both power and control the transponders, this energy being transmitted by the priming, interrogator or erasing units and demodulated and/or rectified in the transponders. Signalling systems of this general type are shown and explained in detail in French Patent No. 1,231,939 granted April 19, 1960.

Figure 1:
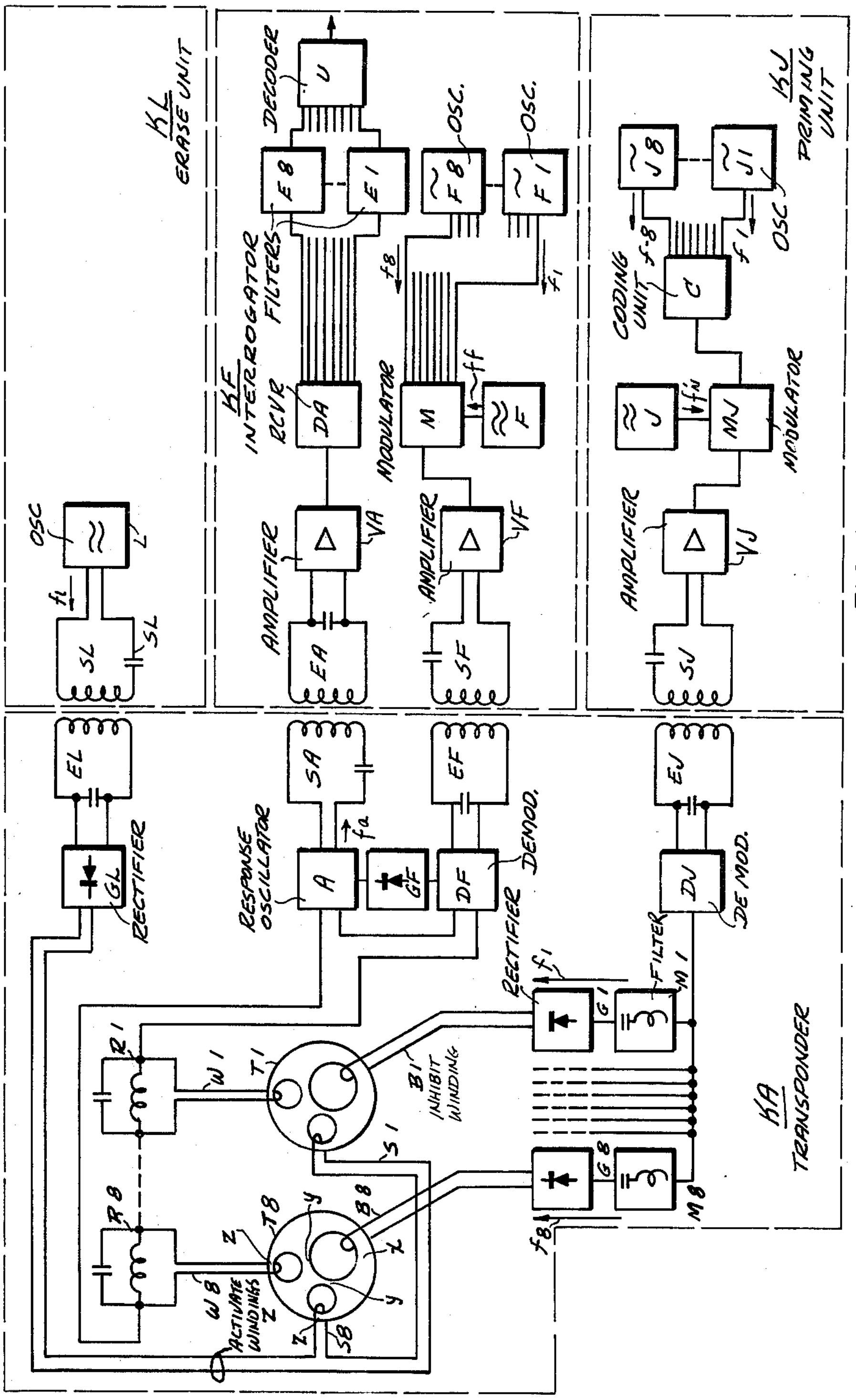
FIGURE 1 illustrates an exemplary embodiment of the invention in which in a transponder the inductances of resonance circuits are changed by magnetically setting or blocking transfluxors.

In FIGURE 1 a movable transponder unit KA (shown at the left side of the drawing) is provided, an identical unit being located on each vehicle. The stations shown at the right side of the drawing are located next to or between the tracks at various locations along the track. A priming unit KJ may be located behind each car loading point. The first interrogator station KF is located at the track from the pit to the starting point of a distribution and unloading system for the mine cars. Additional interrogators may be installed ahead of each track switch. The erase unit KL may be located, for example, at the feeder track of the cage. The purpose of priming or encoding stations such as KJ is to establish or provide a desired code in a passing transponder, so that the transponder, thereafter, on a plurality of occasions, may identify itself according to the code established within itself whenever it is interrogated. The purpose of interrogator unit KF is to "read" or identify each passing transponder from the code established in each transponder. The purpose of erase unit KL is to delete all encoding established in a transponder by priming stations such as KJ, so that new codes may be inserted into the transponder, either by the same priming unit KJ or an identical second priming uit.

It may be assumed that all transponders contain eight resonant circuits R1 to R8 (only the first R1 and the last R8 are shown) tuned to resonance frequencies $f1$ to $f8$, respectively. Each resonant circuit is connected to a transfluxor T1 to T8, with transfluxor output windings W1 to W8 in parallel with the parallel-tuned resonant circuits. Prior to loading the cars, the initial magnetic states of all transfluxors are identical. The inner yokes between the small holes provided for these windings and the large holes for the windings B1 to B8, on the one hand and the outer yokes, on the other hand are magnetized in opposite directions round the large holes and to saturation. For example, the outer yokes are magnetized clockwise around the large holes and the inner yokes counterclockwise. Around the small holes for the windings W1 to W8 both yokes are magnetized on the same clockwise direction which may be changed by A.C. flowing in the windings. Under such magnetization conditions the impedances of transfluxor output windings W1 to W8 will be relatively high, and the resonant circuits R1 to R8 are thus tuned to the interrogated frequencies f1 to f8.

It may be further assumed that, for coding purposes, four each out of the eight resonant circuits are to be detuned while the remaining four are to be left tuned in the normal condition. Thus a "four out of eight" code results, permitting 72 different code configurations and error checking for recognizing malfunctions during interrogation. Assume, for example, that the resonance circuits for frequencies f1, f2, f5, and f7 are to be put detuned at the encoding or priming station shown. Frequency f1 generated by generator or oscillator J is amplified in amplfier VJ, and then transmitted continuously by the transmitter output circuit SJ. Before the vehicle passes the priming station, a switch (not shown) associated with the loaded material, for example coal, is thrown in the coding unit C of the priming station, connecting only the four generators J1, J2, J5 and J7 (of all eight generators J1 to J8 of the frequencies f1 to f8) with modulator MJ, so that the carrier frequency f1 is modulated with the corresponding frequencies. Through inductive coupling this signal is transmitted to the receiver loop EJ of the vehicle's transponder as the vehicle travels by the priming point, and then the signal is demodulated in demodulator DJ. The modulation frequency f1 passes the corresponding filter M1 and is rectified in rectifier G1. Its D.C. output, by way of the inhibitor winding B1, uniformly magnetizes the entire core cross-section of the transfluxor T1 in the same sense, for example in the counterclockwise sense round the large hole, thereby blocking it, and making the impedance of winding W1 so low that resonant circuit R1 is substantially shorted during later interrogation. Identical operation occurs in the transfluxors and resonant circuits (not shown in FIG. 1) associated with frequencies f2, f5 and f7, respectively.

Later the vehicle carrying the encoded transponder arrives at the point of interrogation at which interrogator unit KF is arranged. Oscillators or generators F1 to F8 of interrogator KF are provided with the same operating frequencies f1 to f8 as those used at the priming station KJ. The frequency ff, generated by generator F and different from frequency f1 of the priming unit, is continuously modulated in modulator MF with all eight frequencies f1 to f8, and the modulated signal enters transmitter output circuit SF through amplifier VF. The energy of the carrier frequency ff, which is received by the transponder's receiver circuit EF and demodulated in demodulator DF while the vehicle is passing the interrogation point, powers responder oscillator A (for oscillation at frequency fa) via rectifier GF. The modulation frequencies f1 to f8 are connected to the modulation input circuit of oscillator A through resonant circuits R1 to R8, which may be arranged in series as shown. Of these eight frequencies, only f1, f2, f5 and f7 can pass through the series circuit, since their corresponding resonant circuits are shorted by the transfluxors which had been blocked at the priming point thereby detuning the four resonant circuits. The remaining four frequencies, on the other hand, are blocked by the resonant circuits tuned to the remaining four frequencies. The transmitting circuit SA of the movable transponder therefore transmits (to the receiver circuit EA of the stationary interrogator) a signal whose carrier frequency is fa and whose modulation frequencies are f1, f2, f5 and f7. This response signal is fed through amplifier VA and receiver DA (after demodulation) into the frequency selective filters E1 to E8 arranged to detect frequencies f1 to f8. The output signals of the filters control a converter U which in turn decodes the configuration. The converter output may be recorded automatically and utilized to establish the subsequent route of the transport vehicle. Since the vehicle code has not been erased during the interrogation, it may be interrogated any number of times, e.g., before each subsequent track switch.

Erasing of the code does not take place in most embodiments until after the last stationary interrogator station has been passed. When erasing of the code is desired, a frequency f1 is generated by the generator L in the erase unit KL and transmitted through the transmitter circuit SL to the receiver circuit EL of the transponder. The signal received there energizes, by way of rectifier GL, the activate windings S1 to S8 of transfluxors T1 to T8, which may be arranged in series as shown. The current in these windings magnetizes the outer yokes of transfluxors T1, T2, T5 and T7 in such a direction that the original high impedance state of windings W1 to W8 exists again in all transfluxors and none of the resonant circuits are detuned. Therefore, the resonant circuits will block off the interrogated modulation frequencies f1 to f8. The transponder of the transport vehicle then will be ready to store a new code configuration, and such may be established by moving the transponder to a priming station such as KJ.

Figure 2:
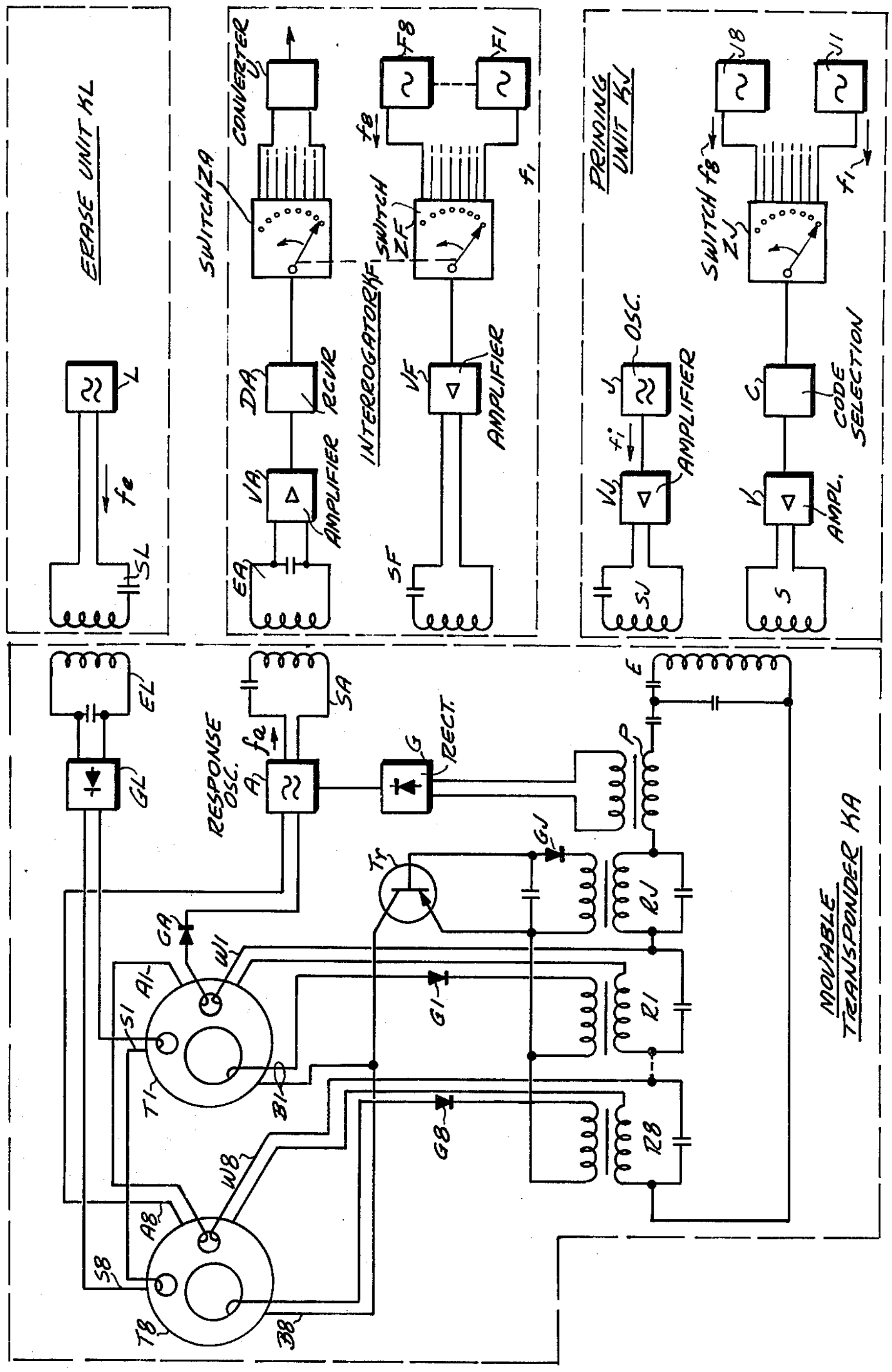
FIGURE 2 illustrates an alternative embodiment in which tarnsfluxors incorporated in a transponder serve as magnetically controlled transformers.

In the example pictured in FIGURE 2 the transmitting circuit SJ of the priming unit KJ is continuously transmitting a frequency f1 generated by generator J and amplified in amplifier VJ. The transmitting circuit S transmits four of the frequencies f1 to f8 in sequence. To this end the continuously rotating electronic switch ZJ consecutively connects the signals from generators F1 to f8 with the coding unit C, wherein the frequencies corresponding to the desired code are selected, and subsequently amplified in amplifier V.

It also is possible to use the several frequencies fi and f1 to f8, a common coupling loop (not shown) for the entire set of frequencies to be transmitted. This common loop may be operated in resonance at several frequencies by means of a well-known recoupling circuit, so that widely separated frequencies may be transmitted with the same degree of efficiency. It also is possible to use individual coupling loops for the frequencies f1 to f8.

It may be assumed again, that the initial magnetic states of all transfluxors of the responder unit KA are identical and such that the inner and the outer yokes of the small holes for the windings W1 to W8 are magnetized in the same direction round these holes. Under such conditions the transfluxors are unblocked. The frequency fi received from priming unit KJ by transponder receiver circuit E energizes the emitter-base-circuit of switching transistor Tr through the resonant circuit RJ and rectifier GJ thus unblocking the emitter-collector-circuit of the transistor.

The other four frequencies received from coding unit C will block four of the eight transfluxors in sequence by uniformly magnetizing the entire core cross-section of the respective transfluxor in the same sense round the large hole, so that the inner and the outer yokes of the small holes are magnetized in opposite senses round the small holes. The currents required to block the transfluxors are picked up from those of the resonant circuits R1 to R8 corresponding to the frequencies passed through code unit C, and rectified in those of rectifiers G1 to G8 associated with such frequencies. A transmission of the frequencies, f1, f2, f5 and f7 at the priming station may be assumed again. For example, transfluxor T1 will be blocked by the current transmitted at frequency f1, which in turn excites resonant circuit R1 and energizes inhibitor winding B1 of transfluxor T1 by way of rectifier G1 and the emitter-collector-circuit of transistor Tr.

At station KF, the point of interrogation, all eight generators F1 to F8 for frequencies f1 to f8 are consecutively switched into the amplifier input VF by the electronic switch ZF. The interrogator transmitter circuit SF accordingly transmits all of frequencies f1 to f8 in sequence, to the transponder's receiving circuit E. The frequency fi is not generated or transmitted at the interrogation point, so transistor Tr remains blocked and no blocking of additional transfluxors is possible. In the circuit of FIGURE 2, the interrogator gets a response from the vehicle transponder unit whenever the interrogator transmits a frequency whose associated transfluxor is not blocked. This may be accomplished by a technique in which windings W1 to W8 of the transfluxors are part of the resonant circuits R1 to R8 and serve as transformer windings for the output windings A1 to A8 connected in series. Since in the case assumed here the transfluxor T1 is blocked, no output signal is present at A1 while the frequency *f*1 is received from interrogator KF. On the other hand, when receiving the frequency *f*8, for example, in the transfluxor T8, in which the inner and the outer yoke of the small hole for the windings W8 and A8 are magnetized in the same direction round the small hole, the current of frequency *f*8 flowing in winding W8 generates an A.C. output in winding A8 which is rectified in rectifier GA and causes the generator A to oscillate on frequency *fa*. The power required for this generator is taken from the energy transmitted by the interrogator, a fraction of which powers the generator A by way of the transformer P, which is actually part of the input filter, through rectifier G. Since the priming or encoding unit KJ had transmitted the frequencies *f*1, *f*2, *f*5 and *f*7, the interrogator does not receive a response while interrogating these frequencies. However, its receiving circuit EA receives the response frequency *fa* when interrogating frequencies *f*3, *f*4, *f*6 and *f*8. The response frequency *fa* is amplified in VA before entering the receiver RA. This receiver output is connected to an electronic switch ZA, which in turn is synchronized with the switch ZF of the interrogator transmitting section. The switch ZA connects the output of receiver DA with the appropriate input of the converter U in accordance with the interrogator frequency which is being transmitted at the time. During one switch revolution, the code complementary to that transmitted by the priming unit and stored by the transponder is given to the converter. The correct (primed) code can be read at the converter output.

Erasing of the code stored by the transponder is accomplished in the example of FIGURE 2 in the same manner as indicated in FIGURE 1.

Figure 3:
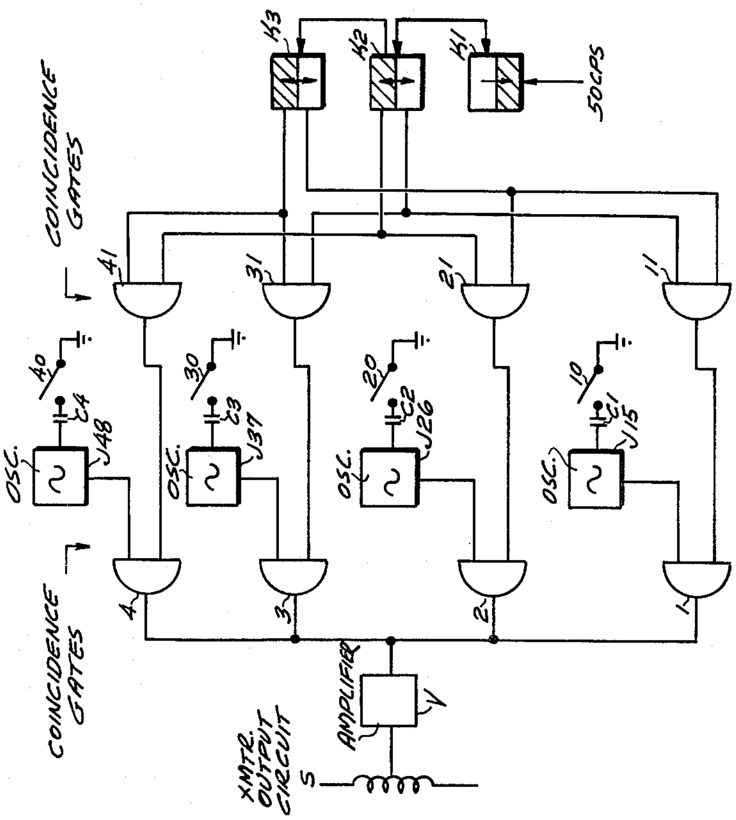
FIGURE 3 illustrates an alternative primbing circuit for a system such as shown in FIGURE 2.

In the exemplary priming or encoding circuit pictured in FIGURE 3, frequencies *f*1 to *f*8 required for transmitting a code "four out of eight" to the transponder are generated by four generators J15, J26, J37 and J48 only. Thus the number of generators is equal to the number of different priming frequencies to be transmitted during the provided priming sequence for a system shown in FIGURE 2. These generators are tuned to the four highest frequencies (*f*5 to *f*8) when contacts 10, 20, 30 and 40 of coding unit C are open. By adding appropriate capacitances C1 to C4 the generator J15 may be tuned to one of the lower frequencies *f*1 to *f*4, the generator J26 to another one of the frequencies *f*1 to *f*4 and so on. The capacitors may be mounted, for example, in a plug-in unit which would contain a stepping switch for the contacts. For example, there may be provided a capacitance C1 for frequency *f*1, a capacitance C2 for frequency *f*2 and a capacitance C4 for frequency *f*5, whereas a capacitance C3 is not required. If the frequencies *f*1, *f*2, *f*5 and *f*7 are to be transmitted to establish the code of a vehicle, contacts 10 and 20 may be closed while contacts 30 and 40 remain open, by way of example. The generator frequencies enter the input of amplifier V, in sequence, by way of coincidence gates 1 to 4, and then are transmitted to the vehicle by the transmitter output circuit S. Gates 1 to 4 are shown controlled by a system of binary counters with flip-flop circuits K1 to K3, through coincidence gates 11, 21, 31, and 41. The circuit K1 is controlled by a 50 c.p.s. signal so that the priming frequencies each are transmitted successively for 20 milliseconds each. A total time of 80 m.s. is thus required for the priming process in the example shown.

Figure 4:
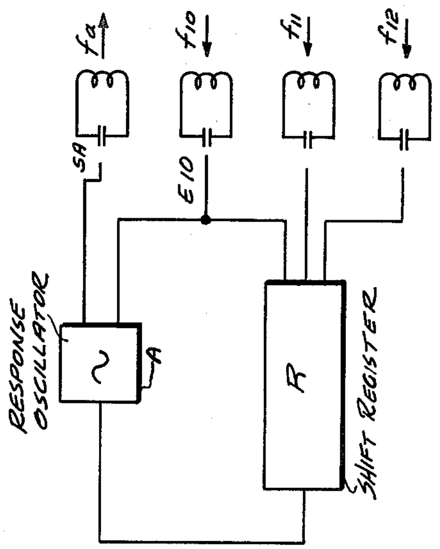

In the transponder pictured in FIGURE 4, a shift register R of conventional type is provided for selecting separate magnetic storage devices (not shown) for the desired identification code. When approaching the priming or encoding station the vehicle or transponder receiver circuit E10 receives the frequency *f*10 which is continuously transmitted by the priming unit. This frequency serves to power the transponder. As soon as the coupling between priming unit and transponder is sufficiently close, the generator A begins to oscillate with a frequency *fa* which is transmitted by the circuit SA. The priming unit receives this frequency *fa* and subsequently begins transmitting the code. The code consists of a prescribed number of shifting pulses on the frequency *f*11, and sometimes a marking pulse on the frequency *f*12, depending on whether instead of a "zero" uniformly stored in the magnetic devices a "one" is to be stored by the selected device during the particular shifting interval. The number of shifting pulses must be such as to operate the shift register through a complete cycle and is identical to the number of separate code units that are interrogated in the system.

The interrogator, which ordinarily is located further along the track, also transmits frequency *f*10 continuously. Upon receiving this frequency the transponder again responds with the frequency *fa*. A reception of this frequency in turn causes the interrogator to transmit the required series of shifting pulses on frequency *f*11. Upon receiving this frequency the magnetic storage device, which is selected by the shift register R sends a "zero" to generator A for each "one" stored during the particular priming interval, and a "one" for a stored "zero," respectively, generator A being shut off each time a "one" occurs. The number and configuration of the gaps in the received frequency *fa* is used by the interrogator unit for making a record of the vehicle and for programming its further course of travel.

Figure 5:
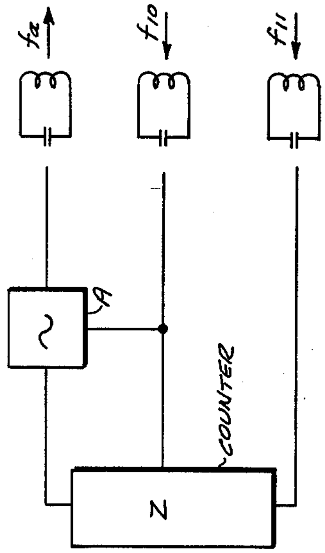
FIGURES 4 and 5 are electrical schematic diagrams of transponders constructed according to the present invention embodying shift registers or counters equipped with magnetic memory cores, in well-known manner.

In the example pictured in FIGURE 5, a counter Z is provided in the transponder. Transponder power is obtained here, too, at the priming and interrogator points, over frequency *f*10. When coupling is sufficiently close this is indicated by the frequency *fa*. For the purpose of priming, the priming unit transmits a series of count pulses on the frequency *f*11, the number of which determines the code and which is smaller, of course, than the capacity of the magnetic memory. For example, the counter may consist of a binary counting chain or of a one-bit shift register. The shift-register may comprise magnetic cores which are remagnetized in a step fashion from the initial saturation to the opposite saturation. For interrogation, the interrogator also transmits count pulses on the frequency *f*11 when the frequency *fa* is received. Whenever the counter reaches its full capacity, a pulse is sent to generator A which temporarily interrupts the transmission of *fa*. The interrogator senses this gap and ceases transmitting additional count pulses. From the number of transmitted count pulses the interrogator unit recognizes the code originally stored and thus the identity of the vehicle. The transponder memory is now in the initial position and can be primed or encoded again with the same code or a new code. If multiple interrogation is desired with this system, each interrogator unit can trigger a further associated priming device (not shown) for restoring the code configuration.

The application of the invention is not limited to the examples presented and explained here. Other code systems and a different number of transmission frequencies may be chosen. When a code "*m* out of *n*" is used, however, it is possible to check the correct number *m* of the responded code units while interrogating, whereas in installations using all possible frequency combinations from one to *n* out of *n* frequencies a minimum number of transmission frequencies is necessary for a prescribed number of different codes, but the checking feature must be omitted. Furthermore, in installations of the type shown in FIGURE 1, the frequencies $f1$ to $f8$ can be transmitted directly and/or in sequence rather than as modulation frequencies. Furthermore, it is possible to use an additional frequency for the purpose of powering the generator A, in installations of the type shown in FIGURE 2. In transponders according to FIGURE 4, parallel and simultaneous input and interrogation of several code units on different frequencies may be employed instead of the exclusive series configuration on the frequency $f12$.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A signalling system for identifying a vehicle comprising in combination, a transponder unit carried by said vehicle operable to transmit at least one identification signal upon receiving a transmitted interrogation signal at a predetermined frequency; said transponder unit including a plurality of parallel resonant circuits, a plurality of multi-aperture magnetic cores each having an inner yoke and an outer yoke independently magnetizable in first and second directions, circuit means linking each of said parallel resonant circuits with one of said apertures of each of said multi-aperture magnetic cores; an interrogator unit for transmitting said predetermined frequency and for receiving said at least one identification signal; a further transmitter for encoding said transponder unit to change said at least one identification signal; and said further transmitter being operable to change the direction of magnetization of said outer yoke of certain ones of said multi-aperture magnetic cores.

2. The system of claim 1 including yet another transmitter for magnetizing said outer yokes of all of said plurality of multi-aperture magnetic cores in the same direction.

3. A movable passive transponder signalling system comprising, in combination, a movable passive transponder unit including a plurality of parallel resonant circuits each resonant at a different frequency and electrically connected in series, a plurality of multi-aperture magnetic cores each having an inner yoke and an outer yoke independently magnetizable in first and second directions, a plurality of first windings each threaded through one aperture of each of said plurality of multi-aperture magnetic cores, and connected in parallel with one of said resonant circuits, the direction of magnetization of said outer yoke determining the impedance of the associated parallel resonant circuit; and means positioned external to said movable passive transponder unit for selectively controlling the direction of magnetization of certain ones of said outer yokes.

4. The movable responder signalling system of claim 3 further comprising a plurality of band-pass filters each tuned to a different frequency, a plurality of second windings each threaded through an aperture of said outer yoke and coupled to the output of one of said filters; a receiving loop; means coupling the output of said receiving loop to the input of all of said band-pass filters; and said means positioned external to said passive movable transponder unit operable to transmit certain ones of the frequencies to which said hand-pass filters are tuned.

5. The movable transponder signalling system of claim 3 wherein said movable passive transponder further includes a plurality of set windings each threaded through another aperture of each of said plurality of multi-aperture magnetic cores, a second receiving loop, means coupling all of said plurality of set windings in series and to the output of said second receiving loop; and second means positioned external to said movable passive transponder unit for selectively setting the direction of magnetization of all of said outer yokes of said plurality of multi-aperture magnetic cores in the same direction.

6. A signalling system for identifying a vehicle comprising in combination, a codable transponder unit carried by said vehicle including a plurality of magnetic memory cores each of which has a portion capable of assuming first and second stable states of flux remanence; first means positioned remote from said vehicle for selectively switching the portions of certain ones of said magnetic memory cores from said first state to said second state whereby said cores provide a predetermined identification code; second means positioned remote from said vehicle for selectively determining said predetermined identification code; and third means positioned remote from said vehicle for selectively switching the portions of all of said cores in the second state to the first state.

7. A signalling system for identifying a vehicle comprising in combination, interrogation means including a carrier frequency oscillator, a plurality of signal frequency oscillators each of a frequency different from all of the others, means for modulating said carrier frequency with all of said signal frequencies, and means for transmitting the resultant signal; a transponder unit carried by said vehicle, said transponder unit including a plurality of parallel resonant circuits each tuned to one of said plurality of signal frequencies, a receiving loop, a demodulator, a response oscillator, and a transmitting loop, means coupling said receiving loop, said parallel resonant circuits, said response oscillator, and said transmitting loop electrically in series in that order, a plurality of magnetic memory cores having at least one aperture, a plurality of winding means each threaded through one of said apertures and connected in parallel with one of said parallel resonant circuits, the impedance of each of said winding means being determined by the direction of remanent flux lines in the vicinity of said aperture, the lower impedance value of each of said winding means substantially detuning said corresponding parallel resonant circuit, whereby said response oscillator transmits the signal frequencies assigned to said detuned parallel resonant circuits; said interrogation station further including means responsive to the signals transmitted by said transponder unit transmitting loop for identifying said vehicle; encoding means positioned external to said vehicle for transmitting selected ones of said signal frequencies; and said transponder unit further including filter means responsive to the signal frequencies transmitted by said encoding means for changing the direction of the remanent flux lines in the vicinity of the aperture of the magnetic memory cores associated with the parallel resonant circuits tuned to the signal frequencies transmitted by said encoding means.

8. The system of claim 7 wherein said response oscillator is powered by a rectified portion of said transmitted resultant signal only.

9. A signalling system for identifying a vehicle comprising in combination, a coded transponder unit carried by said vehicle including a plurality of magnetic memory cores, each of said cores having a portion capable of assuming first and second stable states of flux remanence; a plurality of parallel resonant circuits each resonant to a different signal frequency connected in series and each associated with one of said magnetic memory cores, a receiving loop, a transmitting loop, circuit means coupling said receiving loop, said parallel resonant circuits, and said transmitting loop in series whereby all of said different signal frequencies received by said receiving loop effect said transmitting loop, each of said magnetic memory cores and associated parallel resonant circuit operable to block the signal frequency at which said circuit is resonant when said core is in a predetermined state of flux remanence; first means positioned remote from said vehicle for selectively switching the portions of certain ones of said magnetic memory cores from said predetermined state to the other state to block certain ones of said signal frequencies whereby said blocked frequencies establish an identification code; and second means positioned remote from said vehicle for selectively determining said identification code.

10. The system of claim 9 including third means positioned remote from said vehicle for switching the portions of all of said magnetic memory cores from said other state to said predetermined state.

11. The system of claim 9 wherein each of said cores include a plurality of apertures, at least one of said apertures having a greater diameter than the others of said apertures; winding means threaded through all of said plurality of apertures, and the windings threaded through the apertures of lesser diameter exhibiting a substantial impedance only when the remanent flux lines around all of said apertures are in the same state.

12. The system of claim 11 wherein the winding means threaded through one of the apertures of lesser diameter of each of said plurality of magnetic memory cores is connected in parallel with said associated parallel resonant circuit.

13. The system of claim 11 wherein the winding means threaded through one of the apertures of lesser diameter of each of said plurality of magnetic memory cores is connected in series with said associated resonant circuit; and output winding means threaded through said one of the apertures of lesser diameter.

References Cited by the Examiner

UNITED STATES PATENTS

| | | | |
|---|---|---|---|
| 2,320,150 | 5/43 | Loughridge | 104—88 X |
| 2,414,472 | 1/47 | Loughridge | 246—2 |
| 2,628,572 | 2/53 | Le Goff | 104—88 |
| 2,877,718 | 3/59 | Mittag | 246—2 X |
| 2,898,452 | 8/59 | Berti et al. | 104—88 |
| 2,948,886 | 8/60 | McIlwain | 340—365 |
| 2,981,830 | 4/61 | Davis et al. | 140—88 X |
| 3,016,456 | 1/62 | Corporon | 246—2 |
| 3,125,753 | 3/64 | Jones | 343—6.5 |

NEIL C. READ, *Primary Examiner.*

BENNETT G. MILLER, *Examiner.*